United States Patent
Ohtomo et al.

(10) Patent No.: US 7,671,998 B2
(45) Date of Patent: Mar. 2, 2010

(54) SURFACE CONFIGURATION MEASURING METHOD AND SURFACE CONFIGURATION MEASURING SYSTEM

(75) Inventors: Fumio Ohtomo, Itabashi-ku (JP); Hitoshi Otani, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 209 days.

(21) Appl. No.: 11/096,648

(22) Filed: Apr. 1, 2005

(65) Prior Publication Data

US 2005/0243329 A1 Nov. 3, 2005

(30) Foreign Application Priority Data

Apr. 30, 2004 (JP) .............................. 2004-135439

(51) Int. Cl.
*G01C 11/06* (2006.01)
(52) U.S. Cl. .......................................... 356/601; 356/2
(58) Field of Classification Search .................... 356/2, 356/601, 602, 606, 607; 382/106, 286; 353/5
See application file for complete search history.

(56) References Cited

U.S. PATENT DOCUMENTS

| | | | | |
|---|---|---|---|---|
| 3,314,068 A | * | 4/1967 | Verive | 342/407 |
| 4,641,960 A | * | 2/1987 | Bozzolato | 356/2 |
| 5,141,307 A | | 8/1992 | Bennett | 356/1 |
| 5,500,737 A | * | 3/1996 | Donaldson et al. | 356/606 |
| 6,023,276 A | * | 2/2000 | Kawai et al. | 345/419 |
| 6,304,669 B1 | * | 10/2001 | Kaneko et al. | 382/154 |
| 2002/0071038 A1 | | 6/2002 | Mihelcic | 348/207 |
| 2003/0103651 A1 | * | 6/2003 | Novak | 382/106 |
| 2004/0234123 A1 | * | 11/2004 | Shirai et al. | 382/154 |

FOREIGN PATENT DOCUMENTS

| | | |
|---|---|---|
| JP | 11-223526 | 8/1999 |
| JP | 11-337336 | 12/1999 |
| JP | 2004-028630 | 1/2004 |
| JP | 2004-163292 | 6/2004 |

OTHER PUBLICATIONS

The European communication dated Feb. 4, 2009.

* cited by examiner

*Primary Examiner*—Gregory J Toatley, Jr.
*Assistant Examiner*—Rebecca C Slomski
(74) *Attorney, Agent, or Firm*—Nields, Lemack & Frame, LLC

(57) ABSTRACT

A measuring method, comprising a step of drawing a line on a surface such as ground surface, a step of performing measurement along the line on a predetermined measurement range including the line, a step of acquiring an image of a range including the predetermined measurement range as an image data, a step of superimposing the image data on a measurement data, and a step of calculating a measurement data of the line from line position in the image data and from the measurement data near the line.

14 Claims, 10 Drawing Sheets

FIG. 1
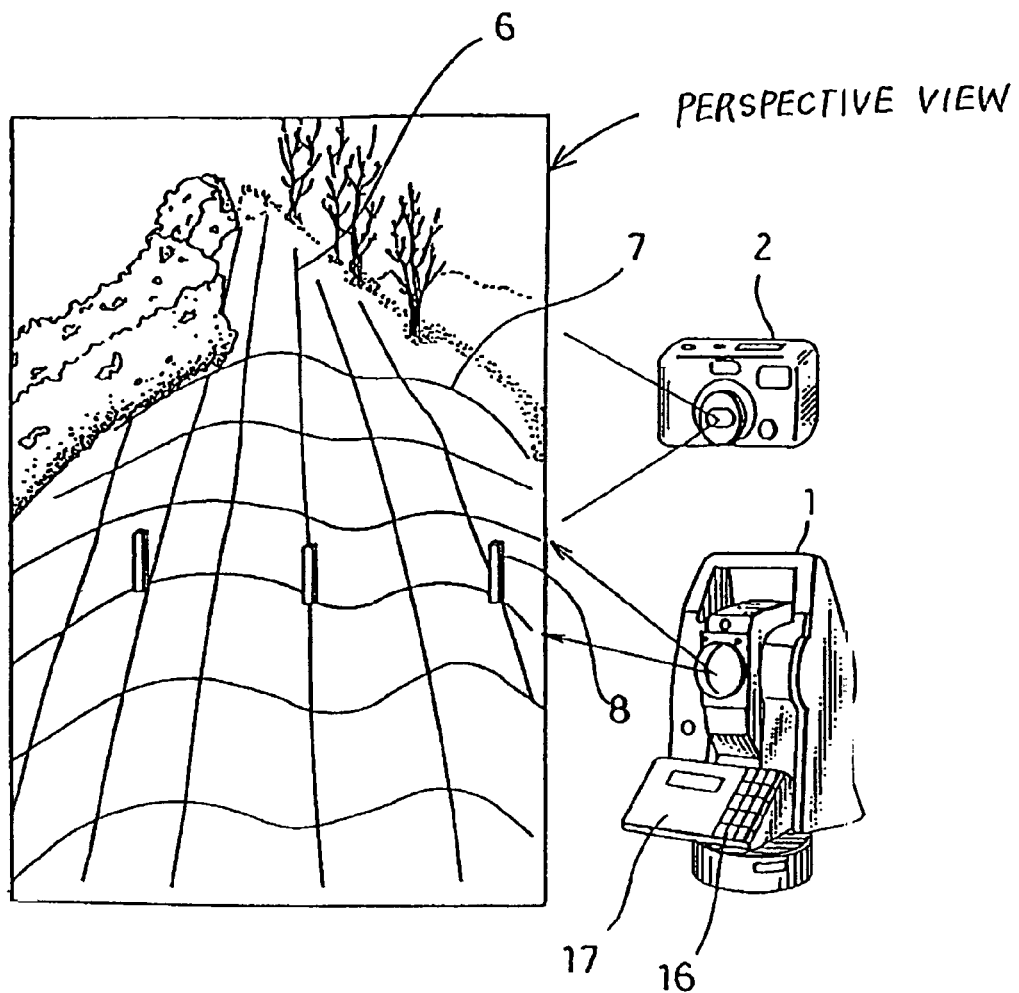
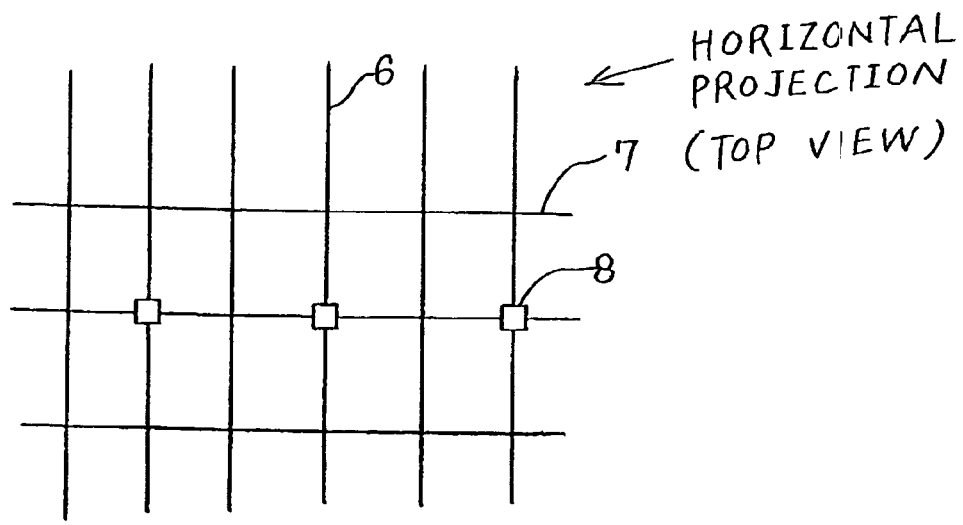

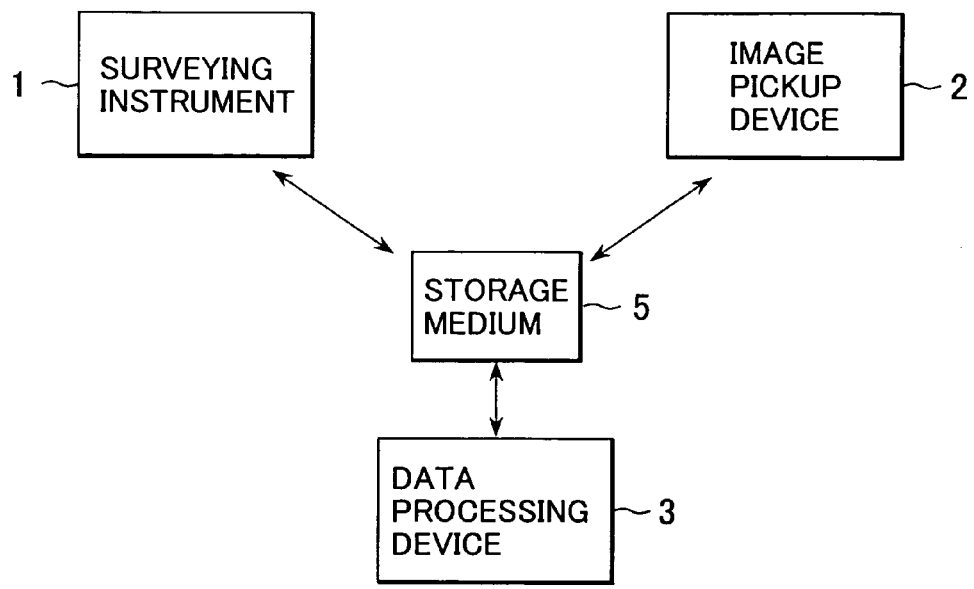
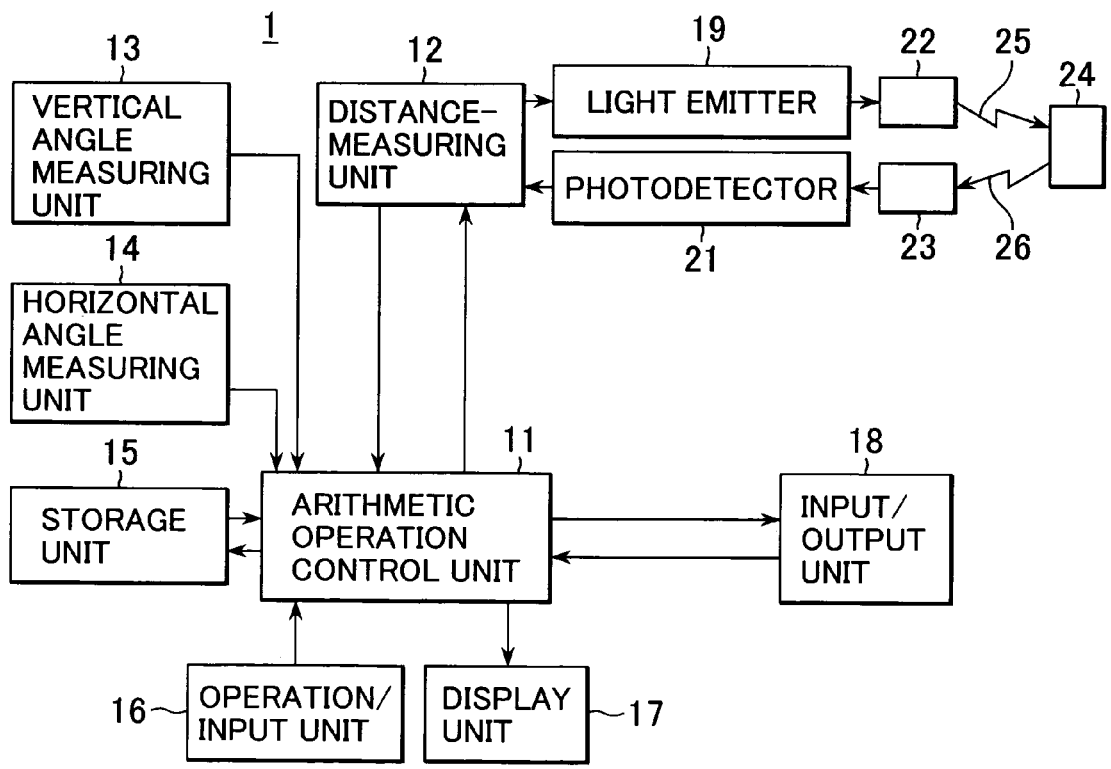

CENTRAL
PROJECTION
(PHOTOGRAPH)

ORTHOGONAL
PROJECTION
(ORTHO-IMAGE)

TIN DATA

PICKUP IMAGE

STEP:13  ORIENTATE AT REFERENCE POINT

STEP:14  TEXTURE MAPPING — PASTE THE PHOTOGRAPHED IMAGE ON TIN (TRIANGULAR NET)

STEP:15  ORTHO-IMAGE — DEVELOPED ON ORTHO-IMAGE

SURFACE CONFIGURATION MEASURING METHOD AND SURFACE CONFIGURATION MEASURING SYSTEM

BACKGROUND OF THE INVENTION

The present invention relates to a measuring method and a measuring system for measuring configuration of a surface such as a ground surface.

In a working project to construct a route or the like, a working plan drawing is prepared, and by taking the amount of graded soil and filling soil into account, the working plan is set up. When the working plan drawing is prepared, actual conditions of the place of work is surveyed to set a reference for the working plan.

For the purpose of carrying out the construction of a route, longitudinal sectional surveying (profile leveling) and cross-sectional surveying (cross sectioning) are performed. Profile leveling is a leveling survey carried out along a centerline of the route. Cross sectioning is a leveling survey in a direction perpendicularly crossing the centerline (in a direction of the route).

In the past, when profile leveling is carried out, stakes with numbers marked on the stakes are driven along a centerline, and elevation of the stake head of the driven stakes with numbers and height of the ground are measured. By measuring the height of the stake head, height and tilting of the ground can be calculated. When cross sectioning is performed, stakes are driven at predetermined intervals along a straight line, which runs perpendicularly to the route. By measuring the elevation of the stake head of the stake, the height of the ground is measured. By measuring the height of the stake head, the height of the ground can be calculated. Based on the results of surveying, a cross-sectional profile (lateral profile) indicating the cross-sectional height is prepared.

For both of profile leveling and cross sectioning, it is necessary to drive stakes for performing surveying. Intervals between stakes are determined by topographical conditions. To drive stakes with too small interval simply means the increase of work and is not adequate. Therefore, the stakes are driven at such a interval as not to place excessive burden on operators. For this reason, in the topographical conditions with extreme ups and downs, the elevation of the stake does not accurately represents actual condition of the ups and downs. Thus, the cross-sectional profile prepared using the elevation of the stake head is merely a schematical drawing. When the stake head is surveyed and the cross-sectional profile is prepared from the height of the stake head, it is assumed that the height of the stake head from the ground surface is at a constant level. If it is not constant, it is not possible to prepare accurate cross-sectional profile. However, it is not very easy to drive many stakes at a constant height. In case of a large-scale working project, long time is required and it is difficult to prepare an accurate cross-sectional profile.

A surveying instrument for acquiring surveying data is described in the Japanese Patent Application Publication No. 11-337336.

SUMMARY OF THE INVENTION

It is an object of the present invention to provide a measuring system, by which it is possible to perform accurate profile leveling and cross sectioning within short time and without giving much burden on an operator.

To attain the above object, the present invention provides a measuring method, which comprises a step of drawing a line on a surface such as ground surface, a step of performing measurement along the line on a predetermined measurement range including the line, a step of acquiring an image of a range including the predetermined measurement range as an image data, a step of superimposing the image data on a measurement data, and step of calculating a measurement data of the line from line position in the image data and from the measurement data near the line. Also, the present invention provides the measuring method as described above, further comprising a step of calculating an equation of a straight line between two measuring points which interposes the line between the two measuring points, and a step of calculating a position of an intersection of the straight line and the line from the equation of the straight line. Further, the present invention provides the measuring method as described above, further comprising a step of preparing TIN from measuring points in the predetermined measurement range, a step of superimposing the TIN on the image data, and a step of calculating measurement data of the line from the TIN including the line in the image data.

Also, the present invention provides a measuring system, which comprises a line drawn on a surface, at least two markers provided on the surface, an image pickup device for acquiring a measurement range including the line and the markers as an image data, a surveying instrument for measuring the markers and the measurement range, and an arithmetic operation unit for superimposing the image data and measurement results by using the marker as a control point and for calculating measurement data of the line based on the line and on the measurement data relating to the line. Further, the present invention provides the measuring system as described above, wherein the arithmetic operation unit prepares TIN from the measurement range, superimposes the image data on the measurement data by using the marker as a control point, and calculates measurement data of the line based on TIN including the line. Also, the present invention provides the measuring system as described above, wherein a curve of cross-section is calculated from the measurement data of the line.

Further, the present invention provides a measuring system, which comprises a straight line drawn on an object to be measured, of which cross-sectional configuration is to be measured, a digital camera for acquiring an image including two or more control points on the straight line as an image data and, a surveying instrument positioned at a known point and for acquiring a measurement data of the control points and a measurement data measured at predetermined intervals for a range including the straight line drawn on the object to be measured, wherein, by matching the measurement data of the control point with the image data, the measurement data measured at the predetermined interval is made to match with the image data, and a height data of the drawn straight line is calculated and cross-sectional configuration of the object to be measured is obtained from positional relationship of the measurement data measured at the predetermined interval and from position of the straight line on the image interposed between the measurement data.

Also, the present invention provides a measuring system, which comprises a straight line drawn on an object to be measured, of which cross-sectional configuration is to be measured, two or more control points on the straight line, a digital camera for acquiring an image including the control points and the straight line as an image data, and a surveying instrument positioned at a known point and for acquiring a measurement data of the control points and measurement data measured at predetermined intervals in a range including the straight line drawn on the object to be measured and within the range, wherein, by matching the measurement data of the control points with the image data, the measurement data measured at the predetermined intervals is made to match with the image data, TIN data for forming a triangular net is prepared based on the measurement data measured at the predetermined intervals, the image data is associated with the TIN data by texture mapping, wherein, based on positional relationship of the TIN data and based on position of the straight line on the image, a height data of the drawn straight line is calculated and cross-sectional configuration of the object to be measured is obtained.

According to the present invention, a measuring method is provided, which comprises a step of drawing a line on a surface such as ground surface, a step of performing measurement along the line on a predetermined measurement range including the line, a step of acquiring an image of a range including the predetermined measurement range as an image data, a step of superimposing the image data on a measurement data, and a step of calculating a measurement data of the line from line position in the image data and from measurement data near the line. As a result, there is no need to drive a number of stakes. This contributes to extensive reduction of working load and also of the time required for the measurement.

BRIEF DESCRIPTION OF THE DRAWINGS

FIG. 1 is a drawing to explain an embodiment of the present invention;

FIG. 2 is a schematical block diagram of a measuring system according to the present invention;

FIG. 3 is a schematical block diagram of a surveying instrument of the measuring system according to the present invention;

DETAILED DESCRIPTION OF THE PREFERRED EMBODIMENTS

Figure 4:
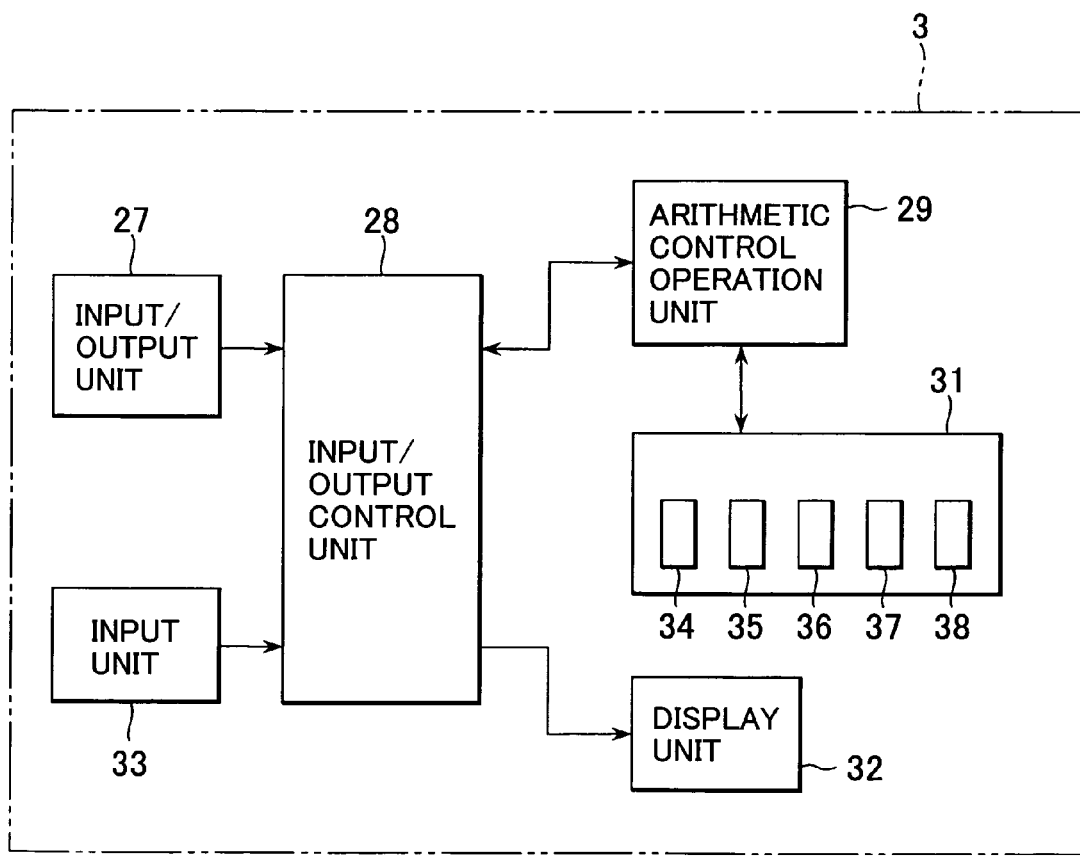
FIG. 4 is a block diagram of a data processing device of the measuring system according to the present invention.
Figure 5:
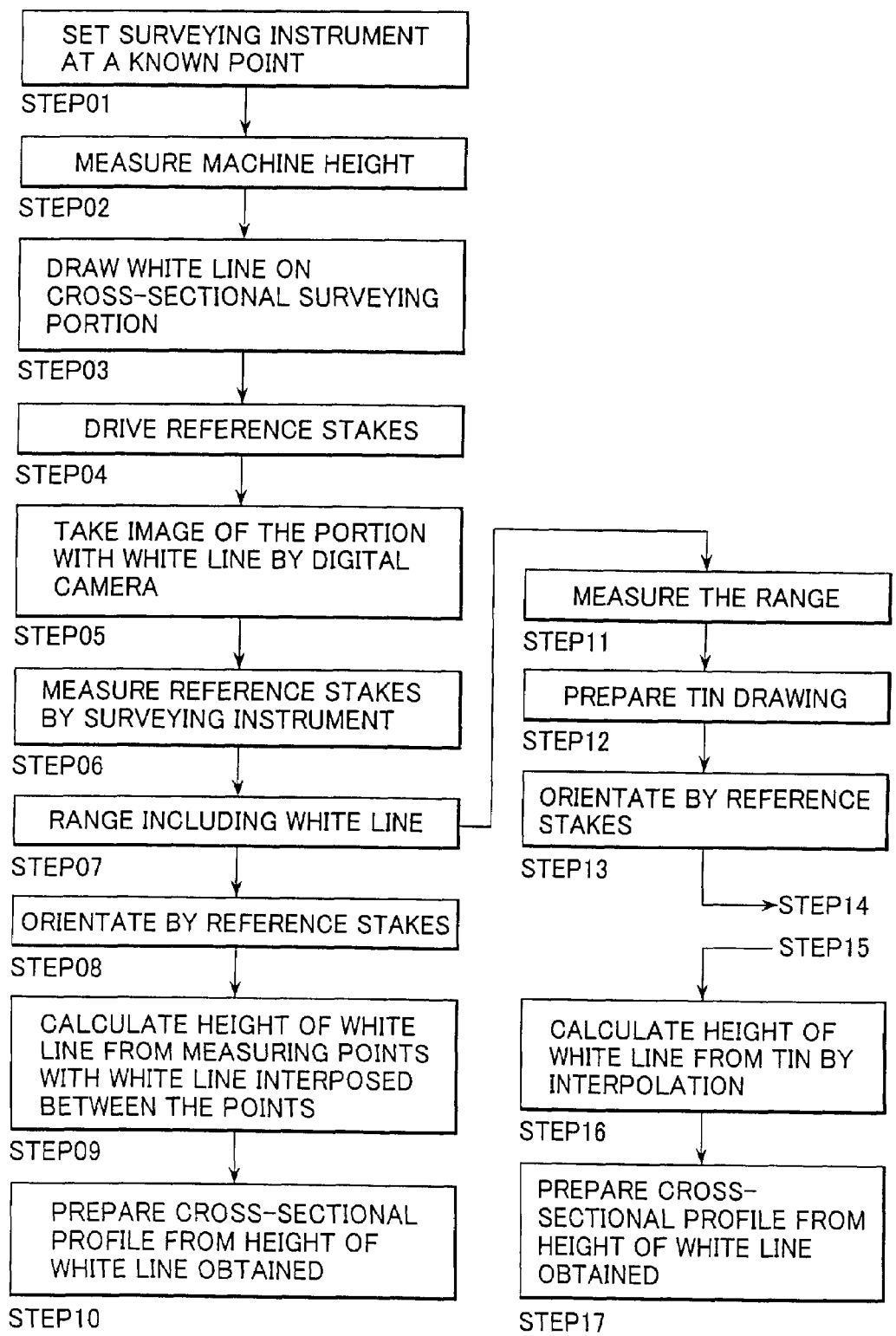
FIG. 5 is a flow chart showing operation in a first embodiment of the present invention.
Figure 6:
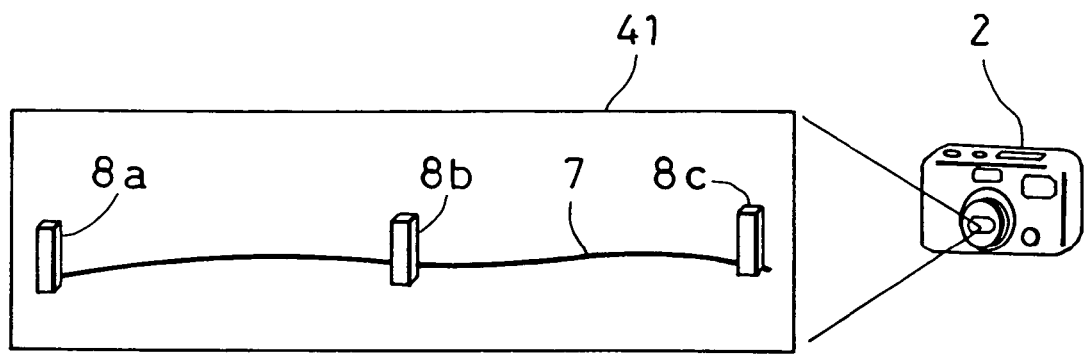
FIG. 6 is a drawing to show relation between an image pickup device and an image data in the first embodiment of the present invention.

Description will be given below on the best mode of the invention to carry out the present invention referring to the drawings.

Referring to FIG. 1 and FIG. 2, general features of a measuring system according to the present invention will be described.

The measuring system primarily comprises a surveying instrument 1 (e.g. a total station (TS)) for measuring distance, horizontal angle and up-to-bottom angle (vertical), an image pickup device 2 (e.g. a digital camera), a data processing device 3 such as a personal computer, a storage medium 5 such as a magnetic storage medium, a semiconductor storage medium, an optical storage medium, etc., measuring lines (a longitudinal sectional line 6 and a cross-sectional line 7) drawn on a ground surface of a measurement range, and at least two markers (reference stakes) 8 (to be described later) driven in the measurement range.

The surveying instrument 1 performs surveying operation such as distance measurement and angle measurement in a range as required. Measurement data is recorded in the storage medium 5, and the measurement data in the storage medium 5 is inputted to the data processing device 3. An image of the measurement range or an image including the measurement range is taken by the image pickup device 2, and an image data (digital data) is recorded in the storage medium 5. The storage medium 5 is removable with respect to the image pickup device 2, and the storage medium 5 is also removable with respect to the surveying instrument 1 and the data processing device 3. By loading the storage medium 5 in the data processing device 3, the data processing device 3 can read out the image data recorded on the storage medium 5.

The data processing device 3 synthesizes the image data with the measurement data, and these data are processed to turn to an image data with measurement data. Further, based on the image data with the measurement data, a longitudinal measurement data and a cross-sectional measurement data are obtained by calculation. Then, on a display unit 32 (to be described later), there are displayed a longitudinal sectional profile, a cross-sectional profile and a contour line chart of the surveying site, which are prepared based on the image data with the measurement data, the longitudinal measurement data and the cross-sectional measurement data.

A user can have the image displayed as a 3-dimensional image or can pick up a measurement data relating to an arbitrary position in the image.

Now, detailed description will be given on devices, which constitute the measuring system.

FIG. 3 shows an example of the surveying instrument 1 used in the present invention.

In FIG. 3, reference numeral 11 denotes a control arithmetic operation unit. A distance-measuring unit 12, a vertical angle measuring unit 13, a horizontal angle measuring unit 14, a storage unit 15, an operation/input unit 16, a display unit 17, and an input/output unit 18 are electrically connected to the control arithmetic operation unit 11. The control arithmetic operation unit 11 and the storage unit 15 make up together an arithmetic operation unit of the surveying instrument 1.

The distance-measuring unit 12 comprises a light emitter 19 and a photodetector 21. From the light emitter 19, a distance-measuring light 25 is projected to an object to be measured (target for measurement) 24 via a projection optical system 22. A distance-measuring reflection light 26 reflected from the object to be measured 24 is received by the photo-detector 21 via a photodetection optical system 23. Based on a photodetection signal issued from the photodetector 21, a distance to the object to be measured 24 is measured. It is designed in such manner that at least the light emitter 19, the photodetector 21, the projection optical system 22, and the photodetection optical system 23 are rotatably supported in horizontal and vertical directions. A horizontal angle and a vertical angle are measured by the vertical angle measuring unit 13 and the horizontal angle measuring unit 14 respectively, and the result of measurement is inputted to the control arithmetic operation unit 11.

The storage unit 15 comprises a program storage unit and a data storage unit. The program storage unit stores a sequence program, a calculation program, etc. required for distance measurement and angle measurement. The data storage unit stores distance measurement data and angle measurement data. From the operation/input unit 16, conditions necessary for starting the distance measurement, a command to initiate distance measurement, etc. are inputted, and measuring conditions, progress of measurement and measurement results, etc. are displayed on the display unit 17.

The input/output unit 18 controls connection with external devices and also controls transmitting and receiving of signals to and from external devices. For instance, data is written to the storage medium 5, or data recorded in the storage medium 5 is read out.

The image pickup device 2 comprises an image pickup element such as a CCD. The image pickup device 2 is a digital camera, etc., for instance, which can output the pickup image as an electronic data. The image taken is turned to digital signals, and these are recorded in the storage medium 5 such as a memory card, or the signals can be outputted to outside.

As shown in FIG. 4, the data processing device 3 comprises an input/output unit 27, an input/output control unit 28, an arithmetic operation control unit (CPU) 29, a storage unit 31 such as a hard disk, a display unit 32 such as a liquid crystal display, and an input unit 33 such as a keyboard, etc. The input/output control unit 28, the arithmetic operation control unit 29, and the storage unit 31 make up together an arithmetic operation unit of the data processing device 3.

The input/output unit 27 reads out the data recorded in the storage medium 5 and writes the data to the recording medium 5, and the data are given to or taken from the arithmetic operation control unit 29 via the input/output control unit 28.

In the storage unit 31, programs such as an image processing program 34 for image processing, a data processing program 35, a measurement data calculating program 36, an image reproducing program 37, etc. are stored, and the storage unit 31 has a data storage unit 38 which stores data such as data from the input/output control unit 28 and calculation data calculated at the arithmetic operation control unit 29.

Based on the input from the input unit 33, various types of programs described above are started, and calculation is carried out. Conditions of processing, calculation results, etc. are displayed on the display unit 32.

Figure 7:
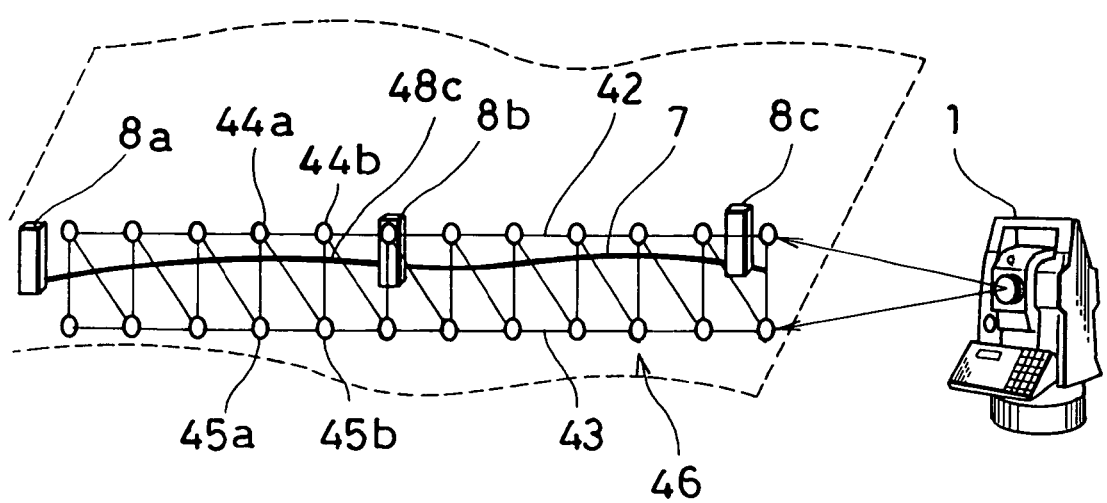
FIG. 7 is a drawing to show relation between a surveying instrument and a measuring data.
Figure 8:
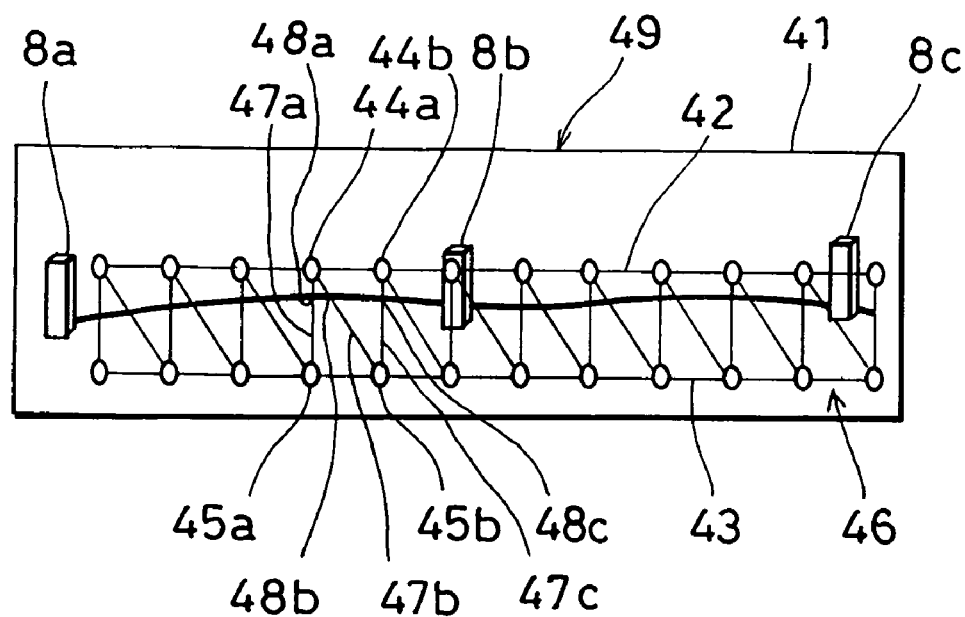
FIG. 8 is a drawing to explain a condition where an image data is superimposed on a measurement data in the first embodiment of the present invention.
Figure 9:
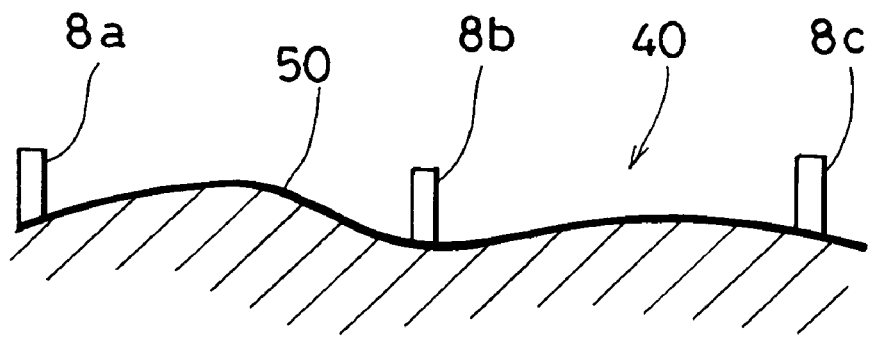
FIG. 9 is a drawing to explain a cross-sectional curve obtained in the first embodiment of the present invention.
Figure 10A:
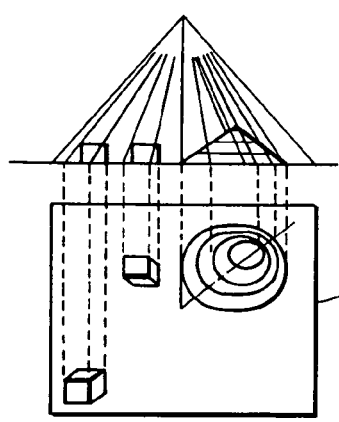
FIG. 10 represents drawings to show relation between a pickup image and an ortho-image in a second embodiment of the present invention.
Figure 10B:
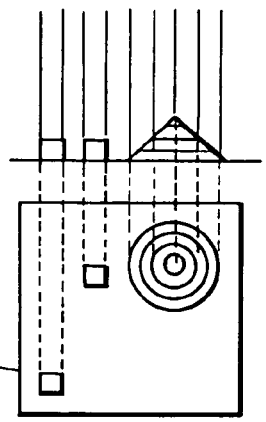
Figure 11:
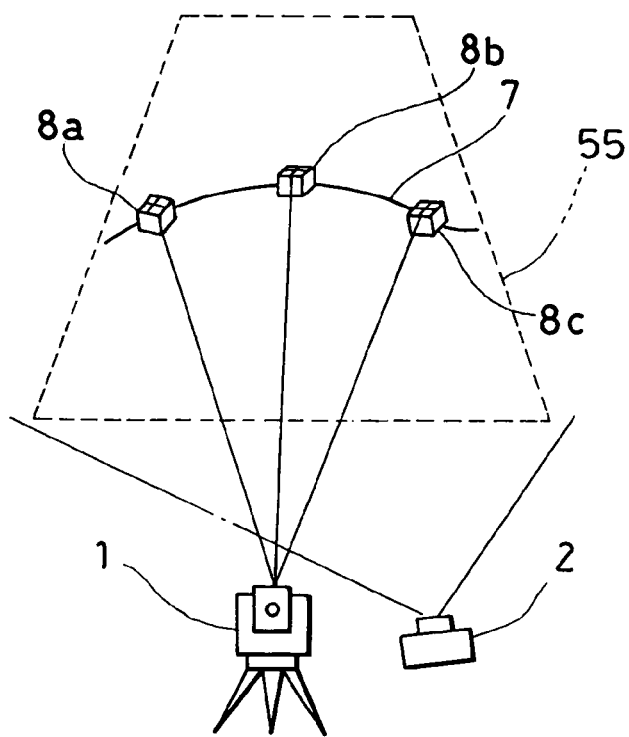
FIG. 11 is a drawing to explain relation among a measurement range, a surveying instrument and an image pickup device in the second embodiment of the present invention.
Figure 12:
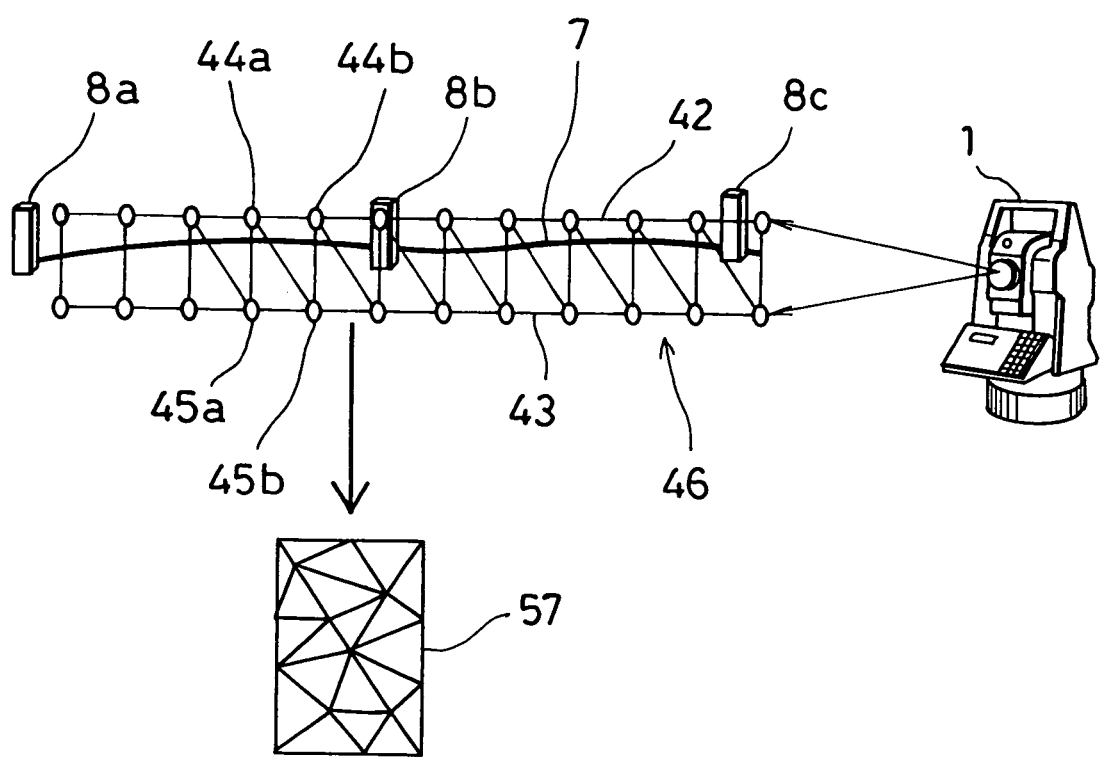
FIG. 12 is a drawing to show relation between a measurement data and a surveying instrument in the second embodiment of the present invention.
Figure 13A:
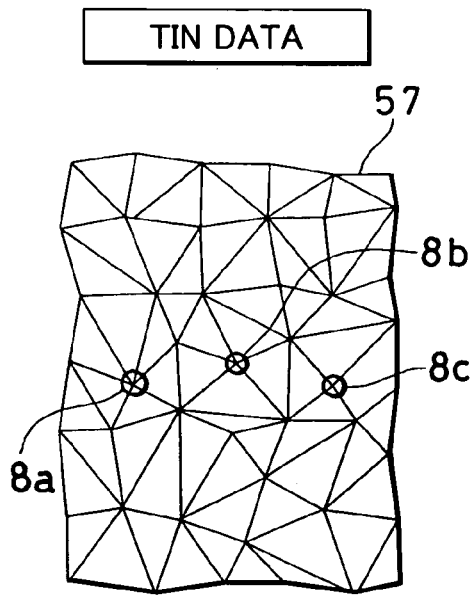
FIG. 13 represents drawings to explain image processing of a TIN data, a pickup image and an ortho-image in the second embodiment of the present invention.
Figure 13B:
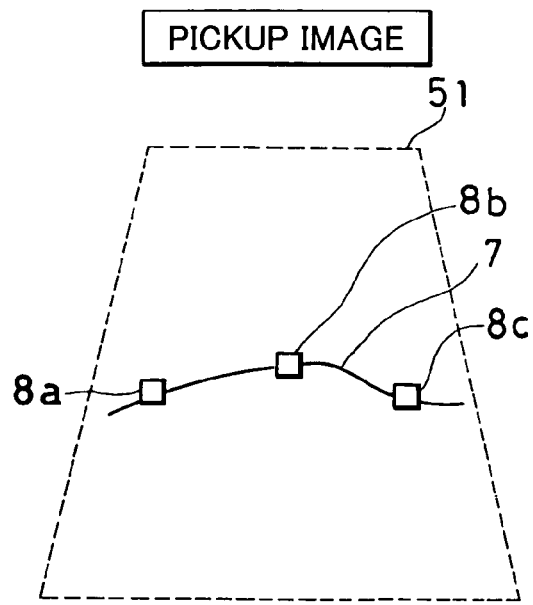
Figure 13C:
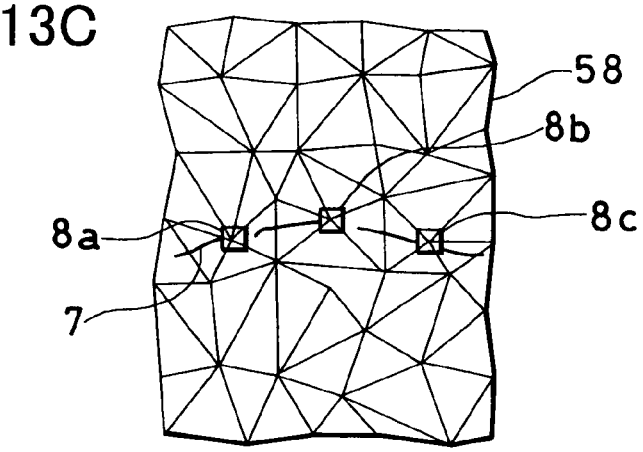

Referring to FIG. 5 to FIG. 9, as a first embodiment of the present invention, description will be given now on an embodiment of a simple case. The following description is given on a case where cross-sectional measurement is carried out. In FIG. 7, a broken line represents configuration of the ground surface.

The surveying instrument 1 is set at a known point, and a machine height of the surveying instrument 1 is measured (Step 01 and Step 02).

A traverse (or a cross-sectional) line 7 (a straight line) is drawn on the ground surface of a portion to be measured (Step 03).

To facilitate the distinction from the ground surface, it is preferable to select and use colors like white color, yellow color, etc.

Reference stakes 8, serving as markers, are driven at least at two points (more preferably at three points or more) along the cross-sectional line 7 (Step 04).

In this case, the marker is not limited to the reference stake, and any object may be selected and used so far as it serves as a target for measurement.

The reference stakes 8 should be driven in such manner that upper surfaces of the reference stakes 8 are maintained at a constant height from the ground surface. Also, it is preferable that cross lines or spots, etc. are marked on the upper surfaces of the reference stakes 8. The upper surface of the reference stake 8, or more preferably, an intersection of the cross lines or the spot, is used as an an control point (to be described later).

An image is taken in the range including the cross-sectional line 7 by the image pickup device 2 approximately from a direction of the surveying instrument, and the image is recorded as an image data 41 in the storage medium 5 (Step 05). In order to reduce the amount of data when the data are recorded in the storage medium 5, the image data 41 may be limited to a required width including the cross-sectional line 7 (a width including measurement lines 42 and 43 as described later). The storage medium 5 is loaded in the input/output unit 27 of the data processing device 3, and the image data 41 is stored in the data storage unit 38. Or, the storage medium 5 may be loaded in the input/output unit 18 of the surveying instrument 1, and measurement may be made.

Measurement is made on the reference stakes 8a, 8b and 8c (measurement of a distance, a horizontal angle and an elevation angle of the control point) by using the surveying instrument 1 (Step 06).

By the surveying instrument 1, the measurement lines 42 and 43 are set on the program in such range as to include the cross-sectional line 7, and normally in a width to include the cross-sectional line 7. Along the measurement lines 42 and 43, measuring points 44a, 44b, and so forth, and measuring points 45a, 45b, and so forth, are automatically measured at predetermined intervals along the measurement lines 42 and 43. Measurement data 46 are acquired (Step 07), and the measurement data 46 are recorded in the storage medium 5. The storage medium 5 is loaded in the input/output unit 27 of the data processing device 3, and the measurement data 46 are stored in the data storage unit 38.

At the data processing device 3, the image processing program 34 and the data processing program 35 are started. The image data 41 and the measurement data 46 are superimposed on each other, and a superimposed data 49 is prepared. The image data 41 and the measurement data 46 are superimposed on each other in such manner that the reference stakes 8a, 8b, and 8c in the image data 41 match with the reference stakes 8a, 8b and 8c in the measurement data 46 using the reference stakes 8a, 8b, and 8c as control points. The image is superimposed on a mesh which is formed by the measuring points.

The measurement data calculating program 36 is started. On the assumption that the cross-sectional line 7 is a straight line, equations of straight lines 47a, 47b and 47c connecting two points which interpose the cross-sectional line 7 therebetween are calculated from the measurement data 46 of the measuring points 44a, 44b and the measuring points 45a and 45b which interpose the cross-sectional line 7 therebetween. Intersections 48a, 48b and 48c of the straight lines 47a, 47b and 47c and the cross-sectional line 7 are obtained from the superimposed data 49. Measurement data of the intersections 48a, 48b and 48c is calculated from the equations of the straight lines 47a, 47b and 47c. The intersection is set at a predetermined position of a width of the cross-sectional line 7, e.g. at a width center of the cross-sectional line 7, and the width center can be obtained from the image data 41.

Similarly, equations of straight lines between two points, which connect the measuring points 44a, 44b, and so forth, and the measuring points 45a, 45b, and so forth, positioned opposite to each other with the crosssectional line 7 therebetween are calculated. Further, measurement data of intersections with the cross-sectional line 7 are calculated (Step 09).

A cross-sectional curve 50 is calculated based on the data of height among the data of the intersections. Based on the cross-sectional curve 50, a cross-sectional profile 40 is prepared by the image processing program 34 (Step 10). The cross-sectional profile 40 shows cross-sectional configuration with respect to the cross-sectional line 7.

The cross-sectional profile 40 is displayed on the display unit 32 by the image reproducing program 37. An operator in charge of measurement can identify the cross-sectional configuration at the cross-sectional line 7 from the cross-sectional profile 40 displayed on the display unit 32. Further, the cross-sectional profiles 40 are obtained on a plurality of cross-sectional lines 7. By displaying the cross-sectional profiles 40 on the same screen, the changing conditions of cross-sections can be visually recognized.

On the image data 41, intersections of a plurality of cross-sectional lines 7 with the longitudinal sectional line 6 at the predetermined position are obtained. By finding the measurement data at intersections on the cross-sectional lines 7 from the cross-sectional curve 50, it is also possible to obtain a longitudinal sectional profile along the longitudinal sectional line 6 at the predetermined position. Further, when the longitudinal sections are obtained individually, measurement lines are set on both sides of the longitudinal sectional line 6, and measurement and calculation are made in a manner similar to the case of the cross-sectional line 7, and the cross-sectional line 7 and the longitudinal section can be obtained.

Instead of drawing the longitudinal sectional line 6 and the cross-sectional line 7 on ground surface, a flexible rope, a belt or a string, etc. may be placed in a straight line on the ground surface.

Now, referring to FIG. 1 to FIG. 5 and FIG. 10 to FIG. 13, description will be given on a second embodiment of the invention, in which measurement is performed more accurately.

In the storage unit 31 of the data processing device 3, there are stored an image processing program 34, a data processing program 35, a measurement data calculating program 36, an image reproducing program 37, etc. The image processing program 34 superimposes TIN data 57 with a pickup image and performs image processing such as conversion from a pickup image 51 which is superimposed with TIN data (one point transmission image)(See FIG. 10) to an orthogonal projection image 52 (ortho-image) or conversion from an ortho-image to an one point transmission image. The data processing program 35 performs data processing such as processing of the image data on the measurement data by texture mapping. The measurement data calculating program 36 obtains measurement data at an arbitrary point on the image from synthesized data of the image data and the measurement data by interpolation of mesh data. The image reproducing program 37 calculates an image as seen from an arbitrary direction. Also, the storage unit 31 has a data storage unit 38 to store data such as data from the input/output control unit 28 and calculation data calculated at the arithmetic operation control unit 29.

Each of the programs as described above is started by the input from the input unit 33, and calculation is made. For instance, on the display unit 32, an image prepared by texture mapping of the measurement data and the image data is displayed. When an arbitrary point in the image is specified, the measurement data calculating program 36 is started, and the data such as positional data, elevation, tilting, etc. of the specified point are calculated and displayed.

Description will be given below on operation.

First, the surveying instrument 1 is set up at a known point, and machine height of the surveying instrument 1 is measured (Step 01 and Step 02).

A cross-sectional line 7 (a straight line) is drawn on the ground surface of the object to be measured (Step 03).

To facilitate the distinction from the ground surface, it is preferable to select and use colors like white color, yellow color, etc.

Reference stakes 8a, 8b and 8c, serving as markers, are driven at least at two point (more preferably, at three points or more) along the cross-sectional line 7 (Step 04).

The reference stakes 8a, 8b and 8c should be set up in such manner that upper surfaces of the reference stakes 8a, 8b and 8c are positioned at a predetermined height from the ground surface. Also, it is preferable that cross lines or a spot, etc. are marked on the upper surfaces of the reference stakes 8a, 8b and 8c. The upper surface of the reference stakes 8a, 8b, and 8c, or more preferably, an intersection of the cross lines or the spot, is used as a control point (to be described later).

The image of the range including the cross-sectional line 7 is taken by the image pickup device 2 from a direction tilted with respect to the cross-sectional line 7, and the image is recorded as an image data 41 in the storage medium 5.

A range including the cross-sectional line 7 is designated as a measurement range 55 by the surveying instrument 1. With respect to the reference stakes 8a, 8b and 8c, measurement are performed. Further, measuring points are automatically measured (See FIG. 12 and FIG. 13 (A). In the figures, all intersections indicate measuring points.) with a predetermined interval in the measurement range 55 (Step 07 and Step 11).

The data at the measuring points, the data of distance measurement, and data of horizontal and vertical angles are recorded in the storage medium 5 via the input/output unit 18. The measurement data 46 can be inputted to the data processing device 3 via the storage medium 5.

By taking the storage medium 5 out of the surveying instrument 1 and by loading the storage medium 5 into the input/output unit 27 of the data processing device 3, the measurement data 46 of the storage medium 5 are read out and are recorded as working data into the data storage unit 38.

The data processing program 35 is started. The measurement data 46 are connected using the measuring points as vertexes and are turned to TIN data 57, which represents a collective body of triangular planes named TIN (triangular indefinite net) (See FIG. 13 (A)) (Step 12). In this case, when the measuring points measured by the surveying instrument 1 are indicated on coordinates, positions indicated by the measuring points are equivalent to the positions displayed in the orthogonal projection image.

Each of the measuring points as described above has 3-dimensional data including planar position and height. A coordinate calculation equation to indicate a triangular plane with three measuring points as vertexes can be calculated based on 3-dimensional data of the three measuring points, and 3-dimensional data at an arbitrary position in the triangular plane can be calculated from the coordinate calculation equation. The coordinate calculation equation is described, for instance, in the Japanese Patent Application Publication No. 2004-163292.

By obtaining the coordinate calculation equations on all of the triangular planes, which have been turned to TIN, it is possible to obtain 3-dimensional data of an arbitrary point in the measurement range 55 by interpolation.

The TIN data 57 and the coordinate calculation equation to indicate the triangular planes (hereinafter referred as "mesh") are stored in the data storage unit 38 together with the measurement data 46 as working data.

The pickup image 51 is outputted as the digital image data 41, and the image data 41 is recorded in the storage medium 5. The storage medium 5 is taken out of the image pickup device 2 and is loaded to the data processing device 3. The image data 41 is inputted to the data processing device 3 via the storage medium 5.

When the storage medium 5 is loaded into the input/output unit 27 of the data processing device 3, the image data 41 in the storage medium 5 is read out and is stored in the data storage unit 38.

The image processing program 35 is started. It is designed in such manner that the reference point (control point) measured by the surveying instrument 1 matches the control point of the pickup image 51. Based on this, an image corresponding to each TIN (triangular net) is processed by texture mapping, and a superimposed measurement data with an image superimposed on it is prepared (Step 14).

Based on the superimposed measurement data processed by texture mapping, the data are developed on the ortho-image 58 (Step 15). In this case, the image is expanded or reduced in size to match the expansion or the reduction of TIN. The pickup image 51 thus converted corresponds to the point in the figure of the TIN data 57 on 1:1 basis (See FIG. 13).

When an arbitrary point in the ortho-image 58 is specified, a mesh is specified, to which the arbitrary point belongs, and 3-dimensional data as seen from the arbitrary position can be calculated by the coordinate calculation equation of the mesh. That is, the ortho-image 58 is an image including 3-dimensional data.

It may be designed in such manner that, in the data storage unit 38, the TIN data 57 and the pickup image 51 are linked to each other for each measurement range or for each mesh in the measurement range. For linking, the TIN data 57 and the pickup image 51 may be stored in different storage areas and may be linked together by management data. Or, different storage area may be used for each mesh, and the data relating to one mesh of the TIN data 57 and image data corresponding to one mesh of the pickup image 51 may be stored in different storage areas respectively.

The measurement data calculating program 36 is started, and TINs in the ortho-image 58 including the cross-sectional line 7 are selected. From the coordinate calculation equation of the TIN, the measurement data of the cross-sectional line 7 is calculated. When the measurement data of the cross-sectional line 7 are calculated for all of the TINs including the cross-sectional line 7, measurement data for total length of the cross-sectional line 7 can be obtained (Step 16). The measuring point in the TIN of the cross-sectional line 7 is at a predetermined position of the width of the cross-sectional line 7, e.g. a width center of the cross-sectional line 7.

A across-sectional curve 50 is calculated based on height data among the measurement data of the cross-sectional line 7. Based on the cross-sectional curve 50, a cross-sectional profile 40 (See FIG. 9) is prepared by the image processing program 34 (Step 17).

The cross-sectional profile 40 is displayed on the display unit 32 by the image reproducing program 37. Further, cross-sectional profiles 40 for a plurality of cross-sectional lines 7 are obtained. By displaying the cross-sectional profiles 40 on the same screen, the changing condition of the cross-sections can be visually recognized.

When intersections of a plurality of the cross-sectional lines 7 with the longitudinal sectional line 6 at the predetermined position are obtained on the image data 41 and when the measurement data of the intersections on the cross-sectional line 7 are obtained from the cross-sectional curve 50, it is possible to have a longitudinal sectional profile along the longitudinal sectional line 6 at the predetermined position.

By writing the associated data (working data) to the storage medium 5, the storage medium 5 can be used as an electronic working data.

If the image processing program 34, the measurement data calculating program 36, and the image reproducing program 37 are stored in the storage unit 15 of the surveying instrument 1, it is possible to display the ortho-image 58 on the display unit 17 of the surveying instrument 1 by loading the storage medium 5, where the working data is recorded, into the input/output unit 18. By storing programs similar to the programs in the storage unit 31 into the storage unit 15 of the surveying instrument 1, it is possible to prepare the working data by the surveying instrument 1 itself.

Figure 14:
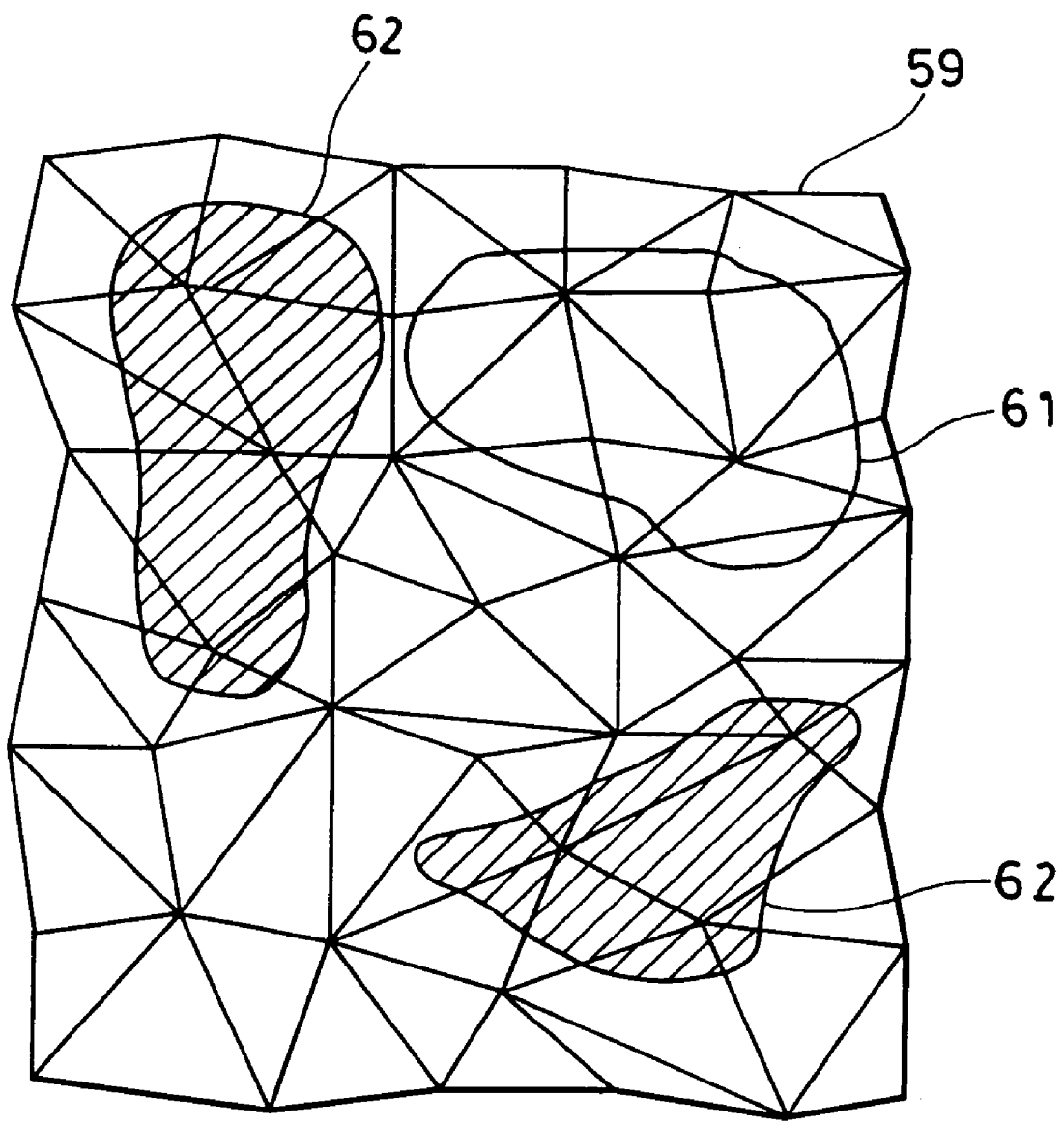
FIG. 14 is a drawing to show an example, in which civil engineering working data is superimposed on finishing data.

Next, referring to FIG. 14, description will be given on a case where civil engineering work is carried out based on TIN data obtained by the process to turn to TINs (3-dimensional data, i.e. measurement data) or based on the working data with the measurement data 46 and the image data 41 synthesized together.

With the progress of civil engineering work, working result data obtained through the execution of the work are sequentially recorded and accumulated, and these are acquired as the finishing data.

The finishing data of civil engineering work are compared with the working data, and the results of comparison are displayed on the display unit 32. FIG. 14 shows an executed work image 59 where poorly worked portion and unworked portion in the comparison results are displayed. By comparatively calculating the finishing data and the working data, it is possible to determine whether the corrective work for the poorly worked portion and the unworked portion is excavating work or soil-filling work. As a result, an operator can easily recognize whether it is excavation work or soil-filling work or can identify the working range as an image.

As a method for displaying the working data, the scope of working is displayed, and it is also displayed whether the scope of working is excavation work or it is soil-filling work. For instance, the scope of excavation 61 and the scope of soil-filling 62 are displayed in different colors so that these can be visually recognized.

In the above, description has been given on the cases where giving and taking of the data are carried out among the surveying instrument 1, the image pickup device 2, and the data processing device 3 via the storage medium 5, while cable may be connected to these devices and data may be given and taken via the cable, or giving and taking of the data may be carried out via communication means such as wireless LAN. Further, when a large amount of data is to be processed, a data collector having a storage device of large capacity such as a HDD may be used instead of the storage medium 5.

In the embodiments as described above, description has been given on the measurement of surface configuration associated with route construction, while the object to be measured is not limited to the ground surface, and it is needless to say that measurement can be made in any case so far as it is a surface such as a tilted surface, to which lines can be drawn.

Further, the marker provided on the line is not limited to the reference stake 8 and anything may be used so far as it can be measured and can be recognized on photograph. Also, the reference stake 8 may be placed at a position other than the cross-sectional line 7 so far as it can serve as a reference for the superimposing of the image data 41 on the measurement data 46.

What is claimed is:

1. A surface configuration measuring method, comprising a step of drawing a straight line on a surface at a position where a cross-sectional configuration is desired to be acquired, said line traversing said cross-sectional configuration, a step of designating a measurement range including said line, said measurement range having a predetermined width including said line, a step of providing two or more markers on said line, a step of acquiring measurement data by distance measurement and angle measurement with respect to said markers and said predetermined measurement range from a point, a step of acquiring from the direction of said point an image of a range including said predetermined measurement range as an image data, a step of superimposing said image data on a measurement data by matching said markers in said image data with said markers in the measurement data, and a step of calculating measurement data of said line from the line position in said image data and from the measurement data near said line, and wherein said step of acquiring said image is carried out after said step of drawing said line.

2. A surface configuration measuring method according to claim 1, wherein said markers are provided on said line drawn on said surface.

3. A surface configuration measuring method according to claim 1, wherein two measurement lines are provided so as to interpose said line drawn on said surface, and said predetermined measurement range is a range enclosed by said measurement lines.

4. A surface configuration measuring method according to claim 3, wherein said measurement data is acquired through measurement at predetermined intervals along said measurement lines.

5. A surface configuration measuring method according to claim 4, further comprising a step of calculating an equation of a straight line which connects a measuring point on one of said two measurement lines with a measuring point on the other of said two measurement lines, and a step of calculating, from the equation of said straight line, a position of an intersection of said straight line and said line drawn on said surface.

6. A surface configuration measuring method according to claim 3, wherein said measurement data is acquired through measurement of an area which is enclosed by said measurement lines.

7. A surface configuration measuring method according to claim 6, further comprising a step of preparing a triangular indefinite net from measuring points in said predetermined measurement range, a step of superimposing said triangular indefinite net on said image data, and a step of calculating measurement data of said line drawn on said surface from the triangular indefinite net including said line in said image data.

8. A surface configuration measuring method according to claim 1, wherein said surface is the ground.

9. A surface configuration measuring system, comprising a straight line drawn on a surface at a position where a cross-sectional configuration is desired to be acquired, at least two markers provided on said surface at a position where said cross-sectional configuration is desired to be acquired, a single surveying instrument installed at a point and for acquiring measurement data by performing distance measurement and angle measurement with respect to said markers and a measurement range including said markers, an image pickup device for acquiring image data of said measurement range including said line and said markers from the direction of said point, and an arithmetic operation unit for superimposing said image data and said measurement data by using said markers as a control point and for calculating measurement data of said line based on said line and on the measurement data relating to said line.

10. A surface configuration measuring method according to claim 9, wherein two measurement lines are provided so as to interpose said line drawn on said surface, and said predetermined measurement range is a range enclosed by said measurement lines.

11. A surface configuration measuring system according to claim 10, wherein said arithmetic operation unit prepares a triangular indefinite net from said measurement range, superimposes said image data on said measurement data by using said markers as a control point, and calculates measurement data of said line based on said triangular indefinite net including said line.

12. A surface configuration measuring system according to claim 9 or 11, wherein a curve of cross-section is calculated from the measurement data of said line.

13. A surface configuration measuring system, comprising a straight line drawn on an object to be measured at a position where a cross-sectional configuration is desired to be acquired, of which cross-sectional configuration is to be measured, two or more markers provided on said line, a single digital camera for acquiring, from the direction of a point, an image data including two or more markers, as the control points, and a surveying instrument positioned at said point and for acquiring measurement data of said control points and measurement data measured at predetermined intervals in a range including said straight line drawn on the object to be measured, wherein, by matching the measurement data of said control points with the image data, the measurement data measured at the predetermined interval is made to match with the image data, and a height data of said drawn straight line is calculated and cross-sectional configuration of said object to be measured is obtained from positional relationship of the measurement data measured at the predetermined interval and from position of said straight line on said image interposed between said measurement data.

14. A surface configuration measuring system, comprising a straight line drawn on an object to be measured, of which cross-sectional configuration is to be measured at a position where a cross-sectional configuration is desired to be acquired, two or more control points on said straight line, a surveying instrument positioned at a point and for acquiring a measurement data of said control points and measurement data measured at predetermined intervals in a range including said straight line drawn on the object to be measured and within said range, a single digital camera for acquiring, from the direction of said point, an image including said control points and said straight line as an image data, wherein, by matching the measurement data of said control points with the image data, the measurement data measured at the predetermined intervals is made to match with the image data, triangular indefinite net data for forming a triangular net is prepared based on the measurement data measured at the predetermined intervals, the image data is associated with said triangular indefinite net data by texture mapping, wherein, based on positional relationship of said triangular indefinite net data and based on the position of the straight line on the image, height data of said drawn straight line is calculated and cross-sectional configuration of said object to be measured is obtained.

* * * * *